(12) United States Patent
Pabla et al.

(10) Patent No.: US 7,533,168 B1
(45) Date of Patent: May 12, 2009

(54) AUTONOMIC GRID COMPUTING MECHANISM

(75) Inventors: Kuldipsingh A. Pabla, Santa Clara, CA (US); Charu V. Chaubal, Burlingame, CA (US); Kenneth Clark, Scotland (GB); Miha Ahronovitz, Saratoga, CA (US); Juan C. Soto, San Francisco, CA (US); Wolfgang G. Gentzsch, Los Altos, CA (US); Gregory Shirin, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 806 days.

(21) Appl. No.: 10/659,820

(22) Filed: Sep. 11, 2003

(51) Int. Cl.
  *G06F 15/173* (2006.01)
  *G06F 15/16* (2006.01)
  *G06F 15/177* (2006.01)
(52) U.S. Cl. .................. 709/224; 709/201; 709/220
(58) Field of Classification Search .......... 709/224, 709/220–222, 201; 718/105, 102, 104
See application file for complete search history.

(56) References Cited

U.S. PATENT DOCUMENTS

| 6,009,455 A * | 12/1999 | Doyle .................. 709/201 |
| 6,286,038 B1 | 9/2001 | Reichmeyer et al. |
| 2002/0042693 A1* | 4/2002 | Kampe et al. .......... 702/186 |
| 2002/0184357 A1 | 12/2002 | Traversat et al. |
| 2003/0084439 A1 | 5/2003 | Perkins et al. |

OTHER PUBLICATIONS

Gerd Kortuem et al., "When peer-to-peer comes face-to-face: Collaborative peer-to-peer computing in mobile ad hoc networks", Aug. 2001, first international conference on peer-to-peer computing proceedings, p. 75-91.*

"Sun Cluster Grid Architecture: a technical white paper describing the foundation of Sun Grid Computing", Sun Microsystems, May 2002.*

"JXTA" by Brendon J. Wilson, published by New Rider Publishing on Jun. 2002.*

(Continued)

*Primary Examiner*—Dustin Nguyen
*Assistant Examiner*—Jeong S Park
(74) *Attorney, Agent, or Firm*—Robert C. Kowert; Meyertons, Hood, Kivlin, Kowert & Goetzel, P.C.

(57) ABSTRACT

An autonomic grid computing mechanism. In embodiments, peer-to-peer platform protocols may be integrated with a grid computing system. Embodiments may use peer-to-peer platform protocols as the transport for the grid computing system. Embodiments may provide one or more of, but not limited to, the following capabilities to grid computing systems: self-deployment and self-configuration, self-updating, self-healing, node removal, master node backup, monitoring, administration, load balancing, grid brokering, decentralized grid, and multi-grid support. Peer-to-peer platform protocols may be used to automatically configure compute nodes. When a node comes up, the node searches for a master node using the peer-to-peer platform. When the node finds a master node, it provides node information to the master node using the peer-to-peer platform. The master node may send the node grid configuration information using the peer-to-peer platform and the node may self-configure as a compute node.

34 Claims, 13 Drawing Sheets

(installation)

OTHER PUBLICATIONS

JXTA by Brendon J. Wilson, published by New Rider Publishing on Jun. 2002, chapter 1.*

Vasfi Gucer, et al., "Automated Distribution and Self-Healing with IBM Tivoli Configuration Manager Version 4.2," IBM, Published Dec. 10, 2002, 333 pages.

"Sun Cluster Grid Architecture- A Technical White Paper Describing the Foundation of Sun Grid Computing," Sun Microsystems, May 2002, (45 pages).

"An Overview of Grid Computing from Sun—Sun Powers the Grid," Sun Microsystems, 2001, (8 pages).

"Sun Grid Engine Software," www.sun.com/software/gridware, Feb. 15, 2001, (3 pages).

Wolfgang Gentzsch, "Grid Computing with Sun," Sun Microsystems, Oct. 2001, (16 pages).

"Sun HPC 2.0 Software—The Power of Parallel Processing," www.sun.com/servers/hpc/software/, Feb. 18, 2001, (1 page).

Wolfgang Gentzsch, "Sun Grid Engine Support for Portals & Grids," Sun Microsystems, Jun. 2001, (18 pages).

"Sun Grid Engine, Enterprise Edition 5.3 Administration and User's Guide," Sun Microsystems, Apr. 2002, (2 pages).

"The SETI@ home Sky Survey," http://setiathome.ssl.berkeley.edu/sciencepaper, Nov. 4, 1999, (5 pages).

* cited by examiner (deployment)

(installation)

(Multi-grid support)

(backup master)

(decentralized)

(grid monitoring)

```
A grid administration node obtains grid information
from one or more grids using one or more peer-to-
peer platform protocols
780
```

```
The grid administration node remotely manages
operations of the one or more grids via the one or
more peer-to-peer platform protocols using the
obtained grid information
782
```

AUTONOMIC GRID COMPUTING MECHANISM

BACKGROUND OF THE INVENTION

1. Field of the Invention

This invention relates to network computing, and more particularly to grid computing systems.

2. Description of the Related Art

Grid computing enables organizations to use their distributed computing resources more efficiently and flexibly, providing more usable power out of existing systems—and helping organizations gain a competitive business advantage. Conceptually, a grid is quite simple: it is a collection of computing resources connected through a network. Grid middleware aggregates these resources—e.g. servers, storage, databases, and scientific instruments—and provides transparent, remote, and secure access to computing power wherever and whenever it is needed. Grid computing aggregates resources and delivers computing power to every user in the network. A compute grid may include distributed compute resources including one or more of, but not limited to: desktop, server, and High Performance Computing (HPC) systems. Grid computing may provide benefits not available with traditional computing models including one or more of, but not limited to: better utilization of resources, increased user productivity, scalability, and flexibility.

The simplest form of a grid, a Cluster Grid, consists of multiple systems interconnected through a network. Cluster Grids may contain distributed workstations and servers, as well as centralized resources in a data center environment. Typically owned and used by a single project or department, Cluster Grids support both high throughput and high performance jobs. Common examples of the Cluster Grid architecture include compute farms, groups of multi-processor HPC systems, Beowulf clusters, and networks of workstations (NOW).

Cluster Grids typically employ a standard three-tier system architecture, as shown in FIG. 1 (prior art). The architecture includes front-end access nodes, middle-tier management nodes, and back-end compute nodes. The access tier provides access and authentication services to the Cluster Grid users. The Management Tier is the middle tier and includes one or more servers that run the server elements of client-server software such as Distributed Resource Management (DRM), hardware diagnosis software, and system performance monitors. The size and number of servers in this tier may vary depending on the type and level of services to be provided. For small implementations with limited functionality, a single node can be chosen to host all management services for ease of administration. Alternatively, these functions may be provided by multiple servers for greater scalability and flexibility. The Compute Tier supplies the compute power for the Cluster Grid. Jobs submitted through upper tiers in the architecture are scheduled to run on one or more nodes in the compute tier. Nodes in this tier run the client-side of the DRM software, the daemons associated with message-passing environments, and any agents for system health monitoring. The compute tier communicates with the management tier, receiving jobs to run, and reporting job completion status and accounting details.

FIG. 2 illustrates an exemplary prior art grid farm. A grid farm may include one or more compute (or execution) nodes 104 and a master node 100. A job submitter (access) node 106 submits jobs to a master node 100. The master node 100 dispatches the jobs to various compute nodes 104. Compute nodes 104 crunch the numbers and return results back to the master node 100, which in turn provides the results to the job submitter node 106. In a prior art grid farm, the master node 100 and compute nodes 104 are configured manually.

Sun's Cluster Grid Architecture

Grid computing systems typically use a traditional model where a Grid Farm has a static view of the network. Sun's Cluster Grid implementation is an exemplary grid computing system that may be used for computation-intensive jobs. The following individual components may be included in Sun's Cluster Grid architecture:

- Sun Grid Engine software
- Development Tools and Run Time Libraries (e.g., Sun HPC ClusterTools™, Forte™ for HPC)
- Technical Computing Portal software (e.g., Sun™ ONE Portal Server)
- System Management Tools (e.g., Sun™ Management Center, SunVTS™, and Solaris JumpStar™ and Web Start Flash)
- Underlying platform (e.g., Solaris Operating Environment, Sun servers, and Sun StorEdge storage products).

Sun Grid Engine software is a distributed management product that optimizes utilization of software and hardware resources. Sun Grid Engine finds a pool of idle resources and harnesses it productively, so an organization gets as much as five to ten times the usable power out of systems on the network. Sun Grid Engine software aggregates available compute resources and delivers compute power as a network service.

JXTA

Sun's JXTA is an exemplary peer-to-peer platform. Peer-to-peer platforms such as JXTA may provide protocols for building networking applications that thrive in dynamic environments. JXTA technology is a set of open protocols that allow any connected device on the network ranging from cell phones and wireless PDAs to PCs and servers to communicate and collaborate in a peer-to-peer (P2P) manner. JXTA peers create a virtual network where any peer can interact with other peers and resources directly even when some of the peers and resources are behind firewalls and NATs or are on different network transports. In JXTA, every peer is identified by an ID, unique over time and space. Peer groups are user-defined collections of entities (peers) that may share a common interest. Peer groups are also identified by unique IDs. Peers may belong to multiple peer groups, discover other entities and peer resources (e.g. peers, peer groups, services, content, etc.) dynamically, and publish themselves and resources so that other peers can discover them.

SUMMARY

Embodiments of an autonomic grid computing mechanism are described. In embodiments, peer-to-peer platform protocols may be integrated with a grid computing system to enable the grid computing system to run in a heterogeneous network and to be self-maintaining. Embodiments may use peer-to-peer platform protocols as the transport for the grid computing system. In embodiments, integrating peer-to-peer platform protocols with a grid computing system may provide one or more of, but not limited to, the following capabilities to grid computing systems: self-deployment and self-configuration, self-updating, self-healing, node removal, master node backup, monitoring, administration, load balancing, grid brokering, and decentralized grids where job submitters may directly discover and submit jobs to compute grids. Embodiments may also allow multi-grid support with multiple master nodes in a single grid.

In one embodiment, grid master nodes may be configured manually. Peer-to-peer platform protocols and discovery mechanisms may be used to automatically configure compute nodes. In one embodiment, a bootstrapping mechanism based on a peer-to-peer platform may be installed on (potential) compute nodes. When a potential compute node comes up, the node (e.g. through a bootstrapping mechanism) may search for a master node using the peer-to-peer platform discovery mechanism. When the potential compute node finds a master node, it may provide detail information about the compute node to the master node using one or more peer-to-peer platform protocols. Based on those details, the master node may know that the new compute node has joined the grid network, record the fact, and, depending on what the compute node's details are, configure the new compute node accordingly.

In one embodiment, the master node may send the new compute node one or more scripts, files, and other grid configuration information using one or more peer-to-peer platform protocols so that the node can self-configure to be grid-ready as a compute node. Before the master node provides the information, the compute node may have had no information about the grid, and may contain no software related to the grid other than the bootstrapping mechanism. Through the configuration over peer-to-peer platform protocols, the master node may send all necessary files and instructions to a new compute node. Using this information, the new compute node may self-configure to become part of the grid network. Whenever a job comes in, the master node knows about the new compute node and may send the new job to the new compute node.

A potential compute node discovering a master node may be a new node joining the network, a compute node that needs upgrading, or a compute node that was shut down and is coming up again. When a compute node reboots, it may inform the master node that it is a new node but that it is already partially or fully configured. In this instance, the master node may not need to fully configure the new node. Depending on the status of the compute node provided to the master node, the master node may determine that the compute node is partially configured and may provide additional configuration information, if necessary.

Figure 1:
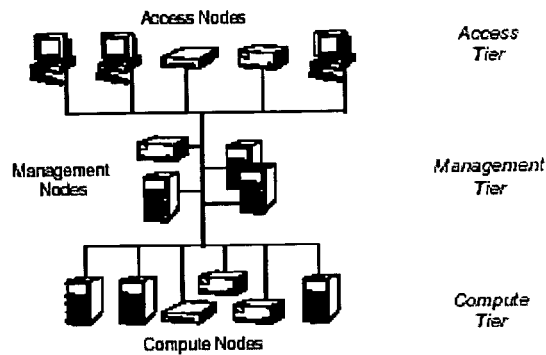
FIG. 1 illustrates a three-tier system architecture for cluster grids according to the prior art.
Figure 2:
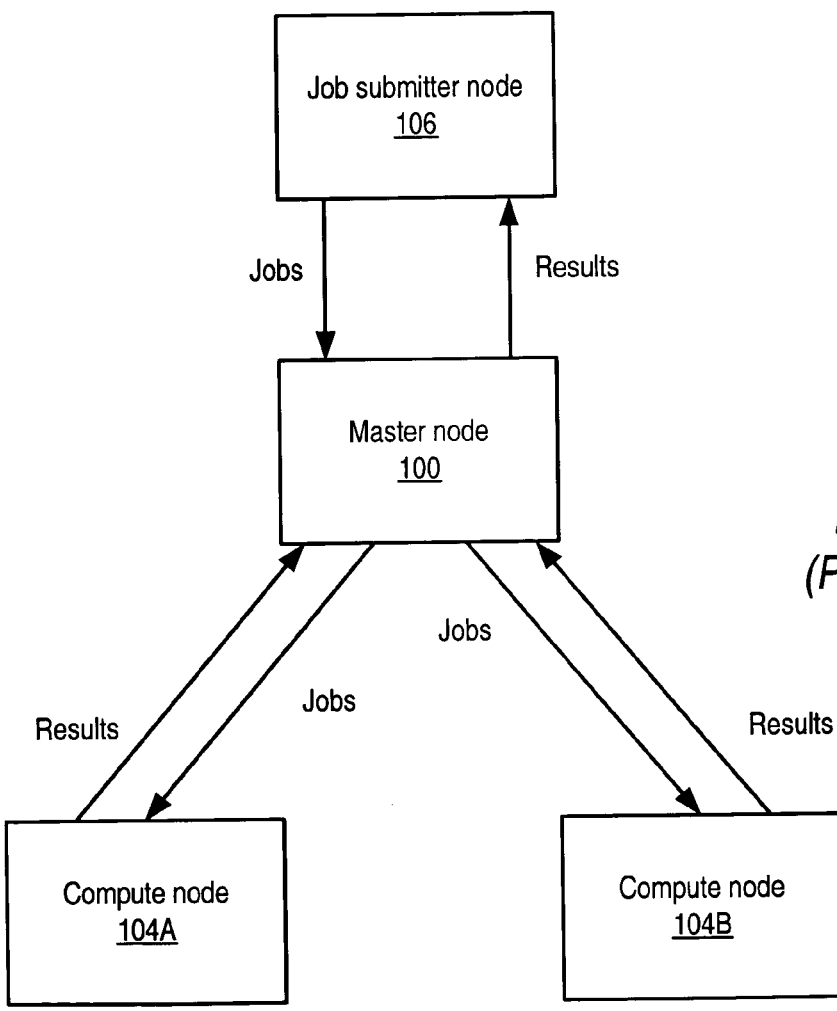
FIG. 2 illustrates a grid farm according to the prior art.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of an autonomic grid computing mechanism are described. Integrating peer-to-peer platform protocols with a grid computing system may enable the grid computing system to run in a heterogeneous network and to be self-maintaining. In embodiments, integrating peer-to-peer platform protocols (e.g. JXTA protocols) with a grid computing system such as the Sun Cluster Grid architecture and Grid Engine may enhance the grid computing system by enabling or improving one or more of, but not limited to: self-deployment and self-configuration, self-updating, node removal, monitoring, administration, load balancing, grid brokering, and decentralized grids. Embodiments may also allow multi-grid support with multiple master nodes in a single grid. Embodiments of the autonomic grid computing mechanism may provide one or more of, but not limited to: a reduced number of manual configurations; quicker deployment; reduced cost of deployment; and preferably simplified addition and removal of nodes in a grid farm.

Embodiments may use peer-to-peer platform protocols (e.g., JXTA protocols) as the transport for the grid computing system. In the prior art, grids typically use TCP/IP. Using peer-to-peer platform protocols may allow a grid computing system to extend and operate on a wider network, across firewalls and other such network barriers.

Embodiments of an autonomic grid computing mechanism may provide one or more mechanisms for adding new compute nodes and for removing compute nodes. Embodiments may allow for the rapid deployment of grid farms. Embodiments of an autonomic grid computing mechanism may provide capabilities including one or more of, but not limited to: multi-grid support, grid management, remote access/management, load balancing, and grid cell selection.

In one embodiment, grid master nodes may be configured manually. Peer-to-peer platform protocols and discovery mechanisms may be used to automatically configure compute nodes. In one embodiment, a bootstrapping mechanism or agent based on a peer-to-peer platform (e.g. JXTA) may be installed on (potential) compute nodes. The bootstrapping mechanism discovers a master node using a peer-to-peer platform discovery mechanism, informs the master node that the node is joining the network using one or more peer-to-peer platform protocols, and provides details of the node to the master node using one or more peer-to-peer platform protocols. When a potential compute node comes up, the node (through the bootstrapping mechanism) may search for a master node using the peer-to-peer platform discovery mechanism. When the potential compute node finds a master node, it may provide detail information about the compute node to the master node using one or more peer-to-peer platform protocols. Based on those details, the master node may know that the new compute node has joined the grid network, record the fact, and, depending on what the compute node's details are, configure the new compute node accordingly. In one embodiment, once the compute node discovers a master node, the peer-to-peer platform bootstrapping mechanism may terminate.

In one embodiment, the master node may send the new compute node one or more scripts, files, and other grid configuration information using one or more peer-to-peer platform protocols so that the node can self-configure to be grid-ready as a compute node. Before the master node provides the information, the compute node may have had no information about the grid, and may contain no software related to the grid other than the bootstrapping mechanism. Through the configuration over peer-to-peer platform protocols, the master node may send all necessary files and instructions (e.g., mount instructions, directories to share, what directories to put files in, permission changes, etc.) to a new compute node. Using this information, the new compute node may self-configure to become part of the grid network. Whenever a job comes in, the master node knows about the new compute node and may send the new job to the new compute node, in one embodiment using one or more peer-to-peer platform protocols.

Note that, in a network, a potential compute node discovering a master node may be a new node joining the network, a compute node that needs upgrading, or a compute node that was shut down and is coming up again. In one embodiment, hen a compute node reboots, it may inform the master node that it is a new node but that it is already partially or fully configured. In this instance, the master node may not need to fully configure the new node. Depending on the status of the compute node provided to the master node, the master node may determine that the compute node is partially configured and may provide additional configuration information, if necessary.

One embodiment may provide a mechanism for patch and/or upgrade management. For example, a compute node may have older software (e.g. version 1.0). The master node may be running newer software (e.g. version 1.1). The master node may determine from the information passed to it by the compute node that the compute node has the wrong version of software and may provide information such as how to upgrade, patches to install, and/or other upgrade information instructions to the compute node.

In one embodiment, peer-to-peer platform protocols may be used by compute nodes to discover master nodes and by master nodes to discover compute nodes. In one embodiment, if a master node knows there are (potential) compute nodes somewhere on the network, the master node may search for the compute nodes using one or more peer-to-peer platform protocols and discovery mechanisms and invite the compute nodes to join the grid.

FIGS. 3, 4, 5 and 6 illustrate means for a node to discover a master node, means for the node to obtain grid configuration information from the master node, and means for the node to self-configure as a compute node in the grid using the grid configuration information.

Figure 3:
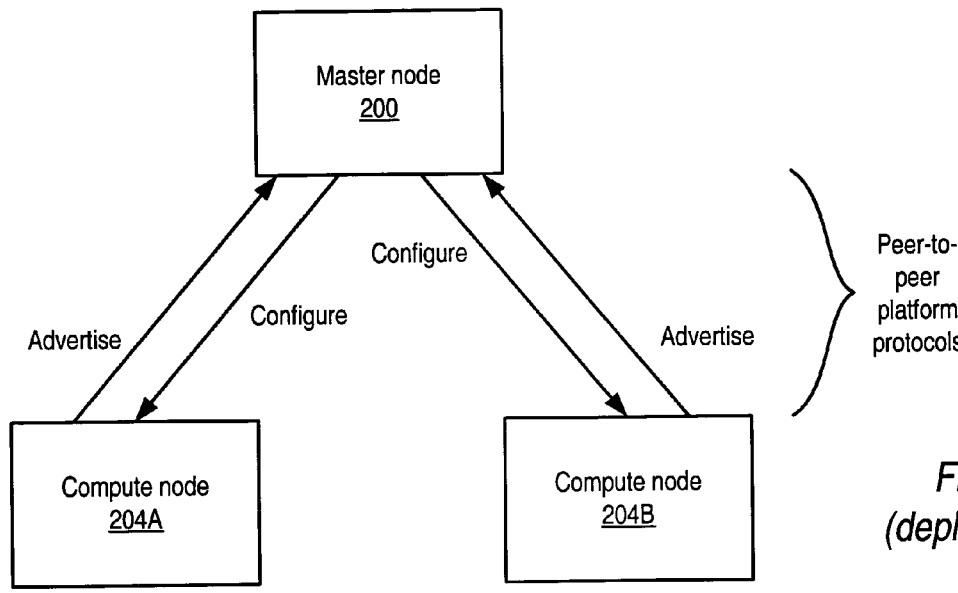
FIG. 3 illustrates deployment and configuration of nodes in a grid farm according to one embodiment.

FIG. 3 illustrates deployment and configuration of nodes in a grid farm according to one embodiment. In embodiments of the autonomic grid computing mechanism, integrating peer-to-peer platform protocols (e.g. JXTA protocols) with a grid computing system (e.g. Sun's Compute Grid architecture and Grid Engine) may enable the grid computing system to be self-deploying and self-configuring.

In one embodiment, deployment (installation and configuration) of the nodes in a grid farm may be automated using peer-to-peer platform (e.g. JXTA) discovery and communication protocols. In one embodiment, the master node 200 may be installed manually. In one embodiment, other nodes (e.g. compute nodes 204A and 204B or potential compute nodes) may be preloaded with a peer-to-peer platform-based (preferably, small footprint) bootstrapping mechanism or agent (not shown). When a new node 204 is deployed in a grid farm network, the bootstrapping mechanism searches for a master node 200 using one or more peer-to-peer platform protocols (e.g. JXTA Discovery protocols). Upon discovery, the new compute node 204 notifies the master node 200 about its presence and capabilities/configuration (e.g. hardware and software capabilities/configuration such as CPU power, disk space, installed software, OS, etc.) using one or more peer-to-peer platform communication protocols (e.g. JXTA Pipe protocols). In one embodiment, the new compute node 204 may notify the master node 200 about its presence and capabilities using advertisements (e.g. JXTA advertisements). The master node 200 then may configure the new compute node 204 and make it part of the grid farm, in one embodiment using one or more peer-to-peer platform communication protocols (e.g. JXTA Pipe protocols). In one embodiment, the master node 200 may send configuration data (e.g. binaries, scripts, NFS mount points, etc.) to the compute node 204. In one embodiment, when a session (job) is complete, the master node 200 may use one or more one or more peer-to-peer platform communication protocols (e.g. JXTA Pipe protocols) to signal the end of session to the compute nodes 204.

In one embodiment, as an alternative to the compute nodes 204 discovering the master nodes 200, a master node 200 may discover compute nodes 204. In this embodiment, the master nodes 200 may be manually configured. The compute nodes 204 may be automatically configured. A master node 200 may used a peer-to-peer platform discovery mechanism (e.g. JXTA's discovery service) to discover one or more compute nodes 204. The master node 200 may then configure the discovered compute nodes 204 using one or more peer-to-peer platform communication services (e.g. JXTA Pipe service). In one embodiment, when a session (job) is complete, the master node 200 may use one or more one or more peer-to-peer platform communication services (e.g. JXTA Pipe service) to signal the end of session to the compute nodes 204.

Figure 4:
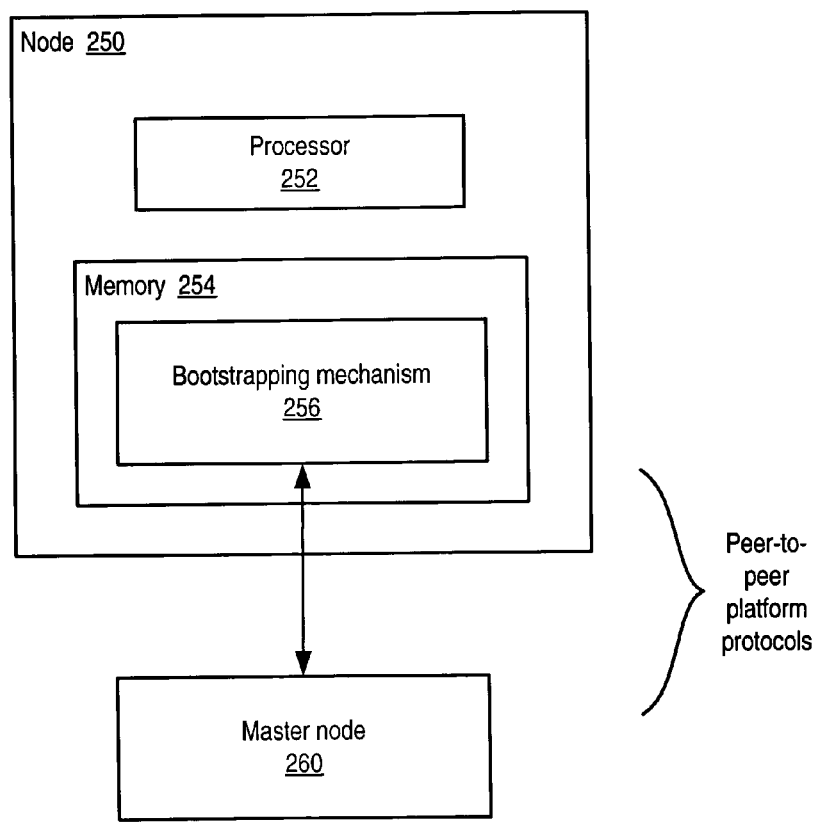
FIG. 4 illustrates a system implementing a bootstrapping mechanism according to one embodiment.

FIG. 4 illustrates a system (node 250) implementing a bootstrapping mechanism according to one embodiment. Node 250 may be any of various types of devices, including, but not limited to, a personal computer system, desktop computer, laptop or notebook computer, mainframe computer system, workstation, network computer, or other suitable device. Node 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 250 may couple over a network to one or more other devices via one or more wired or wireless network interfaces.

Node 250 may include, in memory 254, a bootstrapping mechanism 256. In one embodiment, node 250 may be preloaded with bootstrapping mechanism 256. When node 250 is deployed in a grid farm network, the bootstrapping mechanism 256 searches for a master node 260 using one or more peer-to-peer platform protocols. Upon discovery of master node 260, node 250 may notify the master node 260 of its presence and capabilities/configuration using one or more peer-to-peer platform communication protocols. The master node 260 then may send configuration information to node 250 using one or more peer-to-peer platform protocols, and node 250 may then use the configuration information to self-configure as a compute node in the grid farm.

Figure 5:
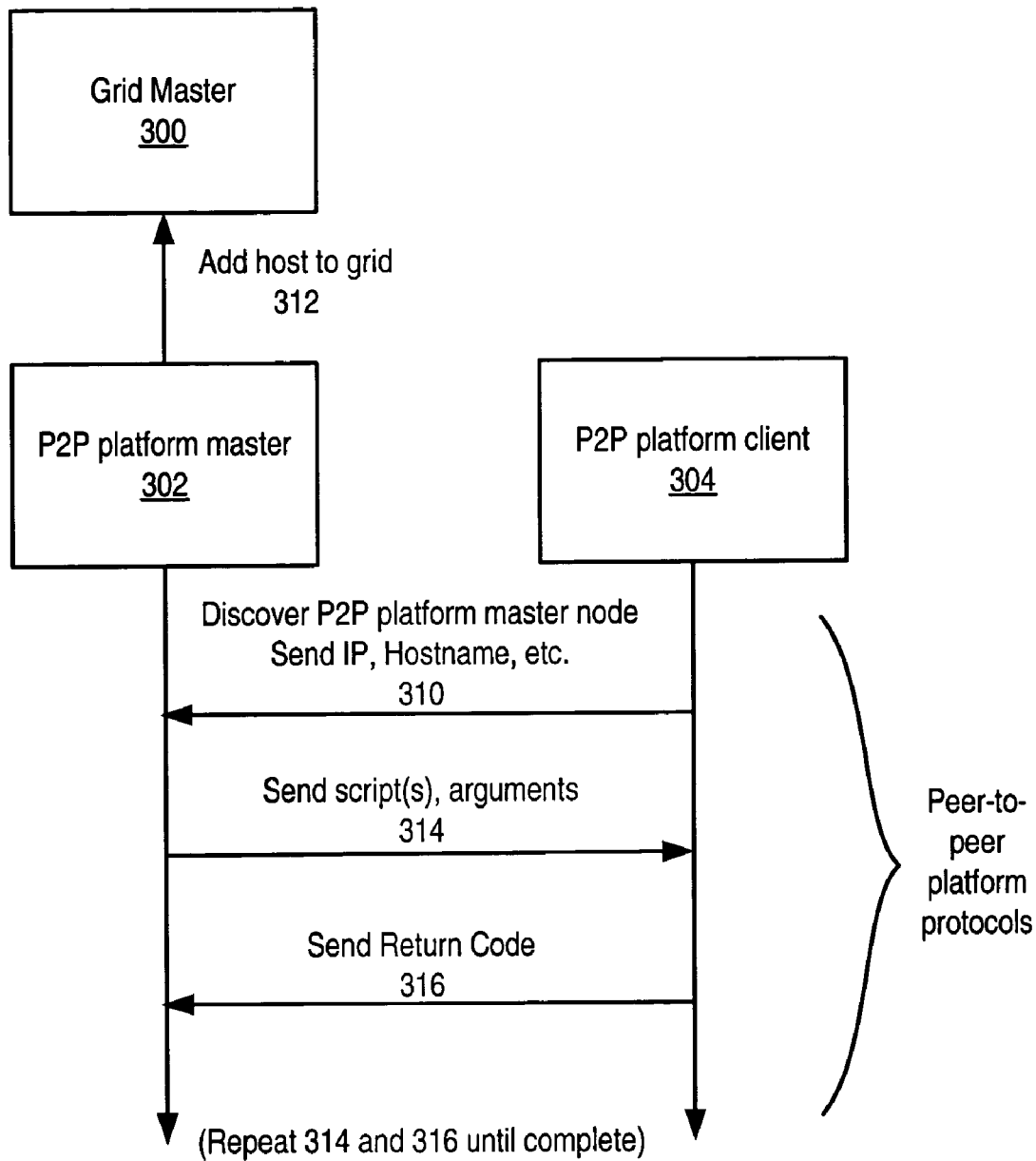
FIG. 5 illustrates a grid installation procedure according to one embodiment.

FIG. 5 illustrates a grid installation procedure according to one embodiment. In one embodiment, a peer-to-peer (P2P) platform agent (e.g. a JXTA agent) discovers another peer-to-peer platform agent (e.g., on its subnet) with which it can communicate. The peer-to-peer platform agent may then communicate with the discovered agent to receive scripts and arguments with which it may self-configure as part of the grid.

In one embodiment, the installation and setup of the P2P platform (e.g., JXTA) master 302 may be performed manually. In one embodiment, a setup file on P2P platform master 302 may include, but is not limited to, the following information: Master Hostname, Master IP, Mount Point, and Command port.

In one embodiment, P2P platform master 302 may include one or more scripts that are configured for use by a P2P platform client 304 to self-install as an execution host (i.e. compute node).

In one embodiment, as indicated at 310, installation may begin with the P2P platform client 304 sending a multicast discovery with its IP address and hostname embedded in the message. As indicated at 312, P2P platform master 302 may then add the execution host to the grid. In one embodiment, this may include setting up the necessary files and informing a grid master 300 of the addition of this host to the grid, for example by sending a command (in an exemplary embodiment using Sun's Grid Engine and JXTA, a qconf-ah command). In one embodiment, this command is preferably run on an administrative host within the grid. In one embodiment, the host that this command is run on is preferably able to resolve the hostname of the P2P platform client 304. In one embodiment, this may be a simple command, either adding this host to a file (e.g. /etc/hosts file) or checking if the P2P platform master 302 can resolve this host and adding on the negative. The peer-to-peer platform IDs (e.g. JXTA ID) of the systems that have been found may be tracked, for example for use in keeping track of the status of the system.

As indicated at 314, script(s) and/or arguments may be sent from P2P platform master 302 to P2P platform client 304. In one embodiment, P2P platform master 302 sends one or more scripts along with arguments to be run on the script(s) in one or more messages (e.g. peer-to-peer platform protocol messages). In one embodiment, P2P platform client 304 may then read the script(s) from the message(s), create a file, and then run the script(s) with the arguments from the message specified within the script.

As indicated at 316, P2P platform client 304 may then send return code to P2P platform master 302. Once P2P platform client 304 is finished running the script, it may send return code back to P2P platform master 302. This return code may, for example, be used to deal with errors that may occur within the scripts, may be logged, and/or may be used in carrying out further action dependent on the return code.

In one embodiment, 314 and 316 (receiving and running the script(s) and arguments) may be repeated with other scripts until the installation has completed successfully. Script actions that may be performed may include one or more of, but are not limited to:

add the grid computing system master name and IP address to a file (e.g., /etc/hosts)
add a command port number to a file (e.g. /etc/services)
add the grid computing system administrator to this host
mount a grid engine directory from a master or NFS server
run a grid computing system "install compute node" script Note that, in one embodiment, this list may reflect the order that the script actions are preferably run in, but in other embodiments, the actions may be performed in other orders, one or more actions may be left out, and/or one or more additional actions may be performed. In one embodiment, the grid computing system may be the Sun Grid Engine (SGE). Once these actions have been completed, the compute node (on P2P platform client 304) will be part of the grid and may be able to run jobs that have been submitted to its queue by P2P platform master 302.

In one embodiment, a peer-to-peer platform (e.g. JXTA) agent on a master node may track the peer-to-peer platform identifiers of each installed host (i.e. compute node) and/or the peer-to-peer platform identifiers of each host that attempts to install. This may allow a status or state to be maintained for each host (compute node) that is installed (or not installed). In one embodiment, this state may be one of: Installed, Uninstalled, or Error.

Figure 6:
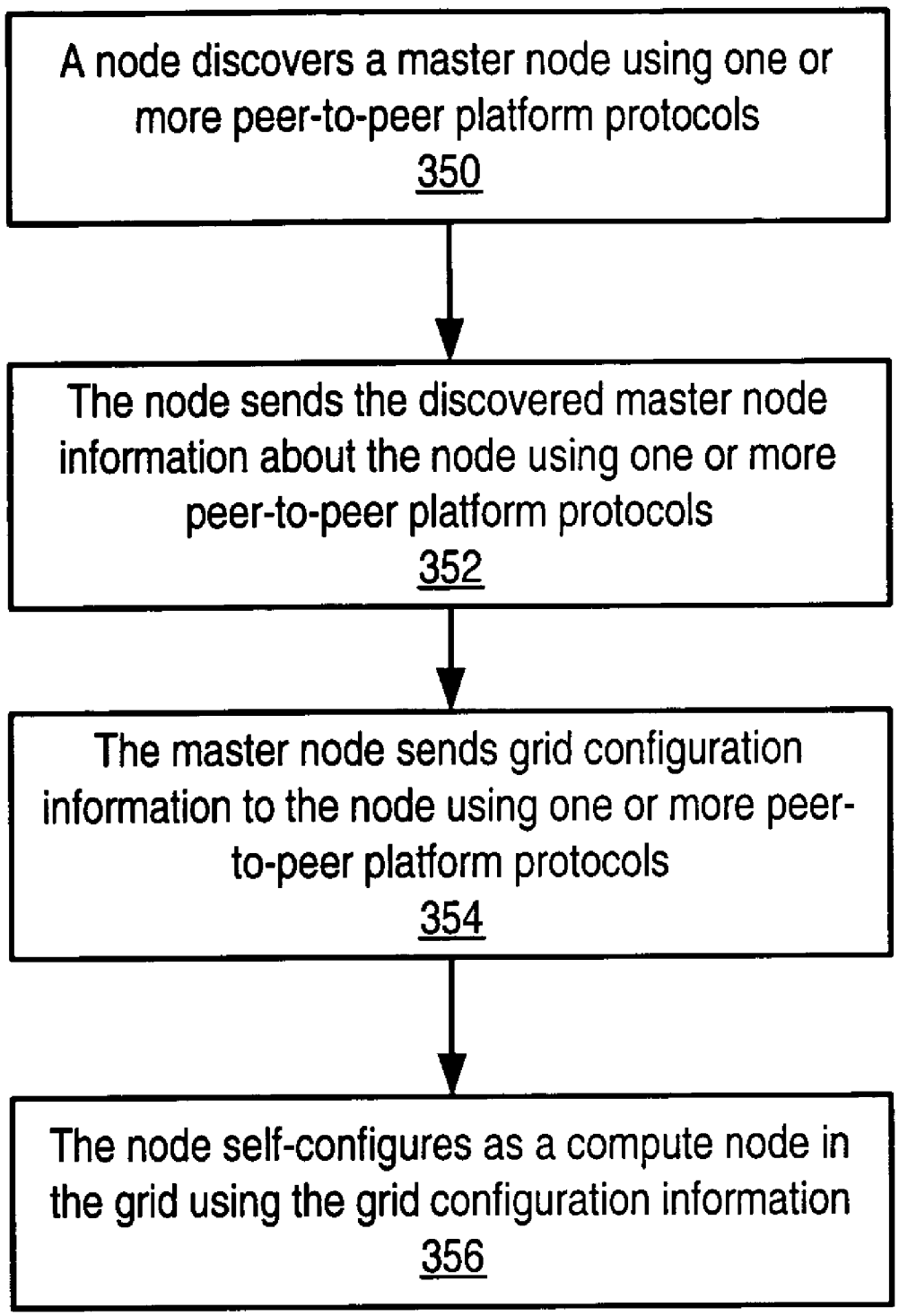
FIG. 6 is a flowchart of a method for self-configuration in a grid according to one embodiment.

FIG. 6 is a flowchart of a method for self-configuration in a grid according to one embodiment. As indicated at 350, a node discovers a master node using one or more peer-to-peer platform protocols, e.g. JXTA protocols. The master node is configured to manage a grid of one or more compute nodes, for example using Sun Cluster Grid architecture. As indicated at 352, the node may send the discovered master node information about the node using one or more peer-to-peer platform protocols. In response to the node informing the master node of its presence and sending information about the node, the master node may send grid configuration information to the node using one or more peer-to-peer platform protocols, as indicated at 354. The node may then self-configure as a compute node in the grid using the grid configuration information, as indicated at 356.

In one embodiment, the node may be a new node or a node that was previously configured as a compute node. In the latter case, to self-configure, the node may update its compute node configuration using the grid configuration information. In one embodiment, if the node was previously configured as a compute node, the information the node sends to the master node may include compute node configuration information for the node. The master node may determine that the compute node configuration needs to be updated from the compute node configuration information. The master node may then include update information for the compute node configuration in the grid configuration information sent to the node.

After the node has self-configured as a compute node in the grid, the master node may record, track, and manage the presence and activity of the new compute node in the grid. In one embodiment, the master node may receive jobs from one or more job submitter nodes using one or more peer-to-peer platform protocols. The master node may distribute one or more jobs to the compute nodes, including the new compute node, for execution using one or more peer-to-peer platform protocols. The master node may receive results of the execution from the compute nodes using one or more peer-to-peer platform protocols, and the master node may then send the results to the job submitter node using one or more peer-to-peer platform protocols.

In one embodiment, if the node later needs to leave the grid, the node may send the master node notification that it is leaving the grid using one or more peer-to-peer platform protocols. In one embodiment, the master node may poll or otherwise track the compute nodes in the grid using one or more peer-to-peer platform protocols. In one embodiment, if the master node has submitted a job to the node for execution that has not completed, after determining or detecting that the node has left the grid, the master node may resubmit the job to another compute node of the grid for execution using one or more peer-to-peer platform protocols.

In one embodiment, a grid farm may be self-updating. In one embodiment, each node in a grid farm may maintain information including one or more of, but not limited to: the version of the grid engine it is using, if it failed during configuration process, etc.

In one embodiment, when a compute node reboots, it may inform the master node about its current status, and the master node may appropriately upgrade/configure the compute node, if necessary. In one embodiment, if a compute node is determined to be properly configured and is running a correct version of grid computing system (grid engine) software, it is preferably not reconfigured. In one embodiment, software upgrades may be performed using a centralized solution such as JNLP, CVS, or other software upgrade methods.

In one embodiment, rather than relying on centralized updating for compute nodes, compute nodes may be updated from a "nearby" peer using one or more peer-to-peer platform (e.g. JXTA) protocols. The nearby peer may be a master node, another compute node, or even a peer that is not currently participating in the grid farm. For the purpose of this document, a "nearby peer" may be considered a logically nearby peer. A logically nearby peer is a peer that may respond as fast as or faster than other peers, but that may or may not be physically nearby or physically closer than at least some other peers. A physically nearby peer is a peer in close physical proximity. However, a physically nearby peer may or may not be logically nearby. In summary, a nearby peer may be considered a peer that is logically nearby which may or may not be physically nearby.

In one embodiment, a compute node may communicate with a nearby peer using one or more peer-to-peer platform (e.g. JXTA) protocols to determine if its grid computing software and/or data is up-to-date and, if not, may download updated software and/or data from the nearby peer. In another embodiment, a compute node may communicate with the master node using one or more peer-to-peer platform (e.g. JXTA) protocols to determine if its grid computing software and/or data is up-to-date and, if not, may communicate with a nearby peer (which may be another execution peer) using one or more peer-to-peer platform (e.g. JXTA) protocols to update its software/data.

In one embodiment, peer-peer-platform (e.g. JXTA) discovery protocols may enable a grid farm to be dispersed geographically at different locations. This may enable a grid farm to be spread among two or more different physical locations instead of all the nodes being deployed at the same physical location (e.g. room).

Embodiments of an autonomic grid computing mechanism may provide a mechanism for node removal. When a compute node needs to leave a grid farm (temporarily or permanently), it may notify the master node using one or more peer-peer-platform (e.g. JXTA) protocols, and the master node may then gracefully remove the compute node from the grid farm. Embodiments of the installation, self-configuration and removal mechanisms described herein, using peer-peer-platform (e.g. JXTA) protocols, preferably enable any node to dynamically join a grid farm, self-configure, and to remove itself if necessary or desired.

Embodiments of an autonomic grid computing mechanism may provide a mechanism for multi-grid support. In this embodiment, there may be multiple master nodes, and thus multiple smaller grids (or grid cells), in a single (larger) grid. Through multi-grid support, job submitters may be configured to automatically select one of the grid cells for performing a particular job. Multi-grid support may also provide load balancing.

In the prior art, grids are monolithic, with one master node and multiple compute nodes. In this prior art architecture, the master node may be a bottleneck for performance and a single point of failure. There is just one master node, and under some conditions, the master node may not be able to dispatch jobs quickly and efficiently. In an embodiment of an autonomic grid computing mechanism that provides multi-grid support, instead of just having one big grid network, the grid network may be split into multiple smaller grids. The job submitter may use peer-to-peer platform protocols to determine which one of the smaller grids may be able to do the job more quickly, and/or to discover other information about the smaller grids that may be used to determine which of the smaller grids is best suited to do the job.

In one embodiment, a job submitter may use the peer-to-peer platform to search for and discover grids, and then determine which grid may perform a job faster and/or cheaper. The job submitter may use peer-to-peer platform (e.g. JXTA) protocols to acquire information about the various grids, and then the job submitter may determine which of the grids it wants to send a job to based on the acquired information. Based on one or more criteria, the job submitter may determine which grid it wants to perform the job. For example, one of the grids may be overloaded, but another grid may be idle. A job submitter may also, for example, look for a grid that matches particular requirements. A particular job may have particular processing requirements, for example graphics processing requirements, and the job submitter may look for a grid that includes at least one compute node with a graphics engine.

Figure 7:
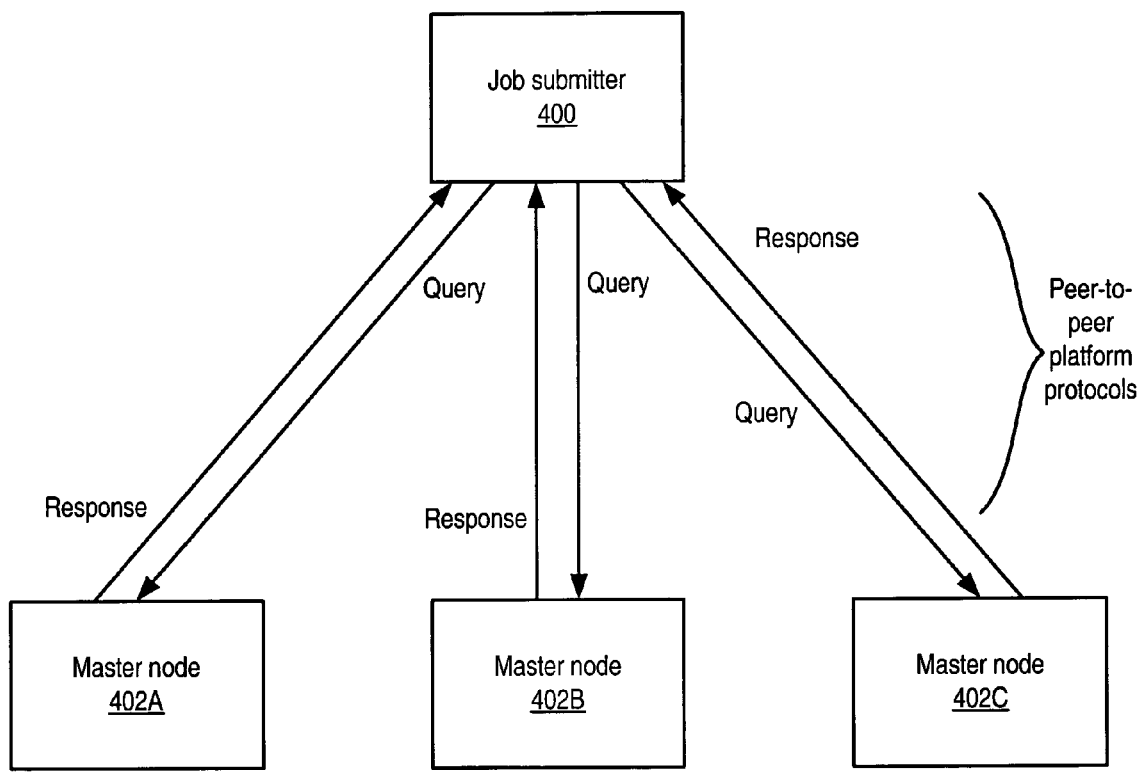
FIG. 7 illustrates multi-grid support according to one embodiment.
Figure 8:
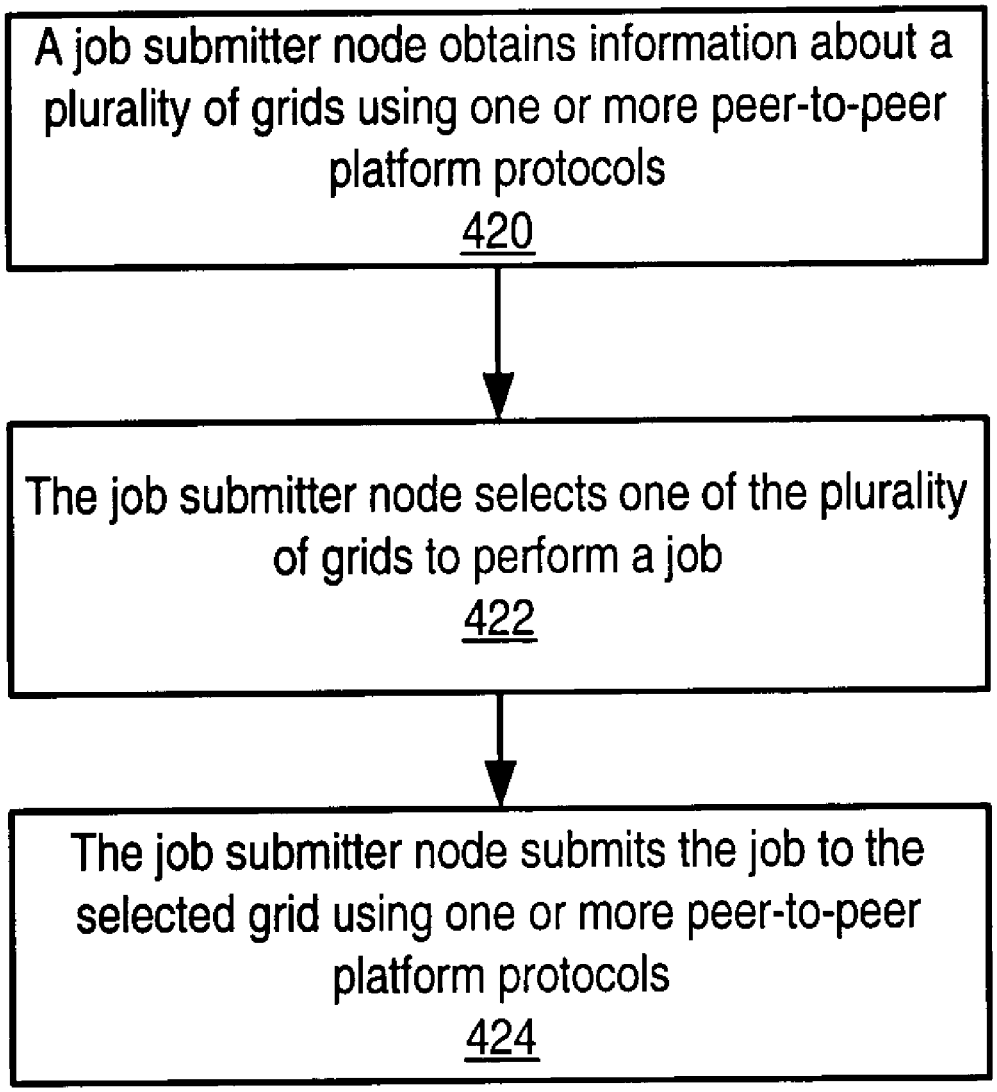
FIG. 8 is a flowchart of a method for selecting grids in a multi-grid environment according to one embodiment.

FIGS. 7 and 8 illustrate means for a job submitter node to obtain information about a plurality of grids, means for the job submitter node to select one of the plurality of grids to perform a job, and means for submitting the job to the selected grid.

FIG. 7 illustrates multi-grid support according to one embodiment. In one embodiment, a job submitter 400 may discover multiple master nodes 402. The job submitter 400 may query the master nodes 402 for information; the master nodes 402 may return information to the job submitter 400 including one or more of, but not limited to: specific special resources or processing capabilities of the compute nodes managed by each master node 402, the number of pending jobs on each master node 402, anticipated delay, etc. Job submitter 402 may then use this information to select a grid for performing a particular job according to one or more criteria. For example, job submitter 402 may select a least busy grid or a grid with particular resources or processing capabilities needed to perform the job.

FIG. 8 is a flowchart of a method for selecting grids in a multi-grid environment according to one embodiment. As indicated at 420, a job submitter node may obtain information about a plurality of grids using one or more peer-to-peer platform protocols. In one embodiment, the plurality of grids may be configured according to Sun Cluster Grid architecture. Other embodiments may use other grid architectures. In one embodiment, the peer-to-peer platform protocols may be JXTA protocols. Other embodiments may use other peer-to-peer platform protocols. As indicated at 422, the job submitter node may select one of the grids to perform a particular job. In one embodiment, the job submitter node may determine from the obtained information that the selected grid is best suited to perform the particular job based on one or more criteria including, but not limited to: speed of job execution (how quickly it is expected the grid can execute the job and return results) and one or more special processing requirements (e.g. graphics capabilities) for the compute nodes of the grid. As indicated at 424, after selecting the grid, the job submitter node may submit the particular job to the selected grid (and, potentially, additional jobs) using one or more peer-to-peer platform protocols.

Embodiments of an autonomic grid computing mechanism may provide a mechanism for load balancing among grid farms using one or more peer-to-peer platform (e.g. JXTA) protocols. In one embodiment, before submitting a job to a grid farm, a job submitter may use one or more peer-to-peer platform protocols to search for a suitable grid farm in a multi-grid environment. Determining a suitable grid farm may be based on criteria such as how many jobs are pending in a grid's queue, if a grid farm has particular resources required to complete a job, etc. In one embodiment, a job submitter may determine which one of the grids is likely to complete the job faster considering the current load.

Embodiments of an autonomic grid computing mechanism may provide a mechanism for self-healing in grid farms. In one embodiment, two or more nodes may be (manually) configured as master nodes. One or more of the configured master nodes may serve as actual master nodes, and one or more of the configured master nodes may be backup or "shadow" master nodes, not actively serving as master nodes. If an active master node goes down or becomes unavailable, the peer-to-peer (e.g. JXTA) protocols may be used to detect that the master node is not active and one of the other nodes configured as a master node may take over the master node operations for the grid of the (no longer available) master node.

Through the self-healing mechanism, if one of the compute nodes goes away, the master node may determine, using peer-to-peer platform protocols, that the compute node is no longer part of the grid. In one embodiment, the compute node may send notification of departure to the master node using a peer-to-peer platform protocol. Alternatively, the master node may poll the compute nodes using one or more peer-to-peer platform protocols. After discovering that a compute node is no longer available, the master node does not submit new jobs to the compute node. If the compute node was working on a job when it became unavailable, the master node may submit the job to another compute node for completion using one or more peer-to-peer platform protocols. In one embodiment, the master node may maintain information about the status of a job, and to may submit the job to another compute node for continuation of processing from the point that the former compute node had reached in performing the job. Alternatively, the master node may submit the job to the other compute node to be restarted from the beginning. In one embodiment, if the master node discovers a compute node has left the grid before completing a job, the master node may resubmit the job to another compute node using one or more peer-to-peer platform protocols transparently to the job submitter, i.e. without the job submitter being aware of it.

Figure 9:
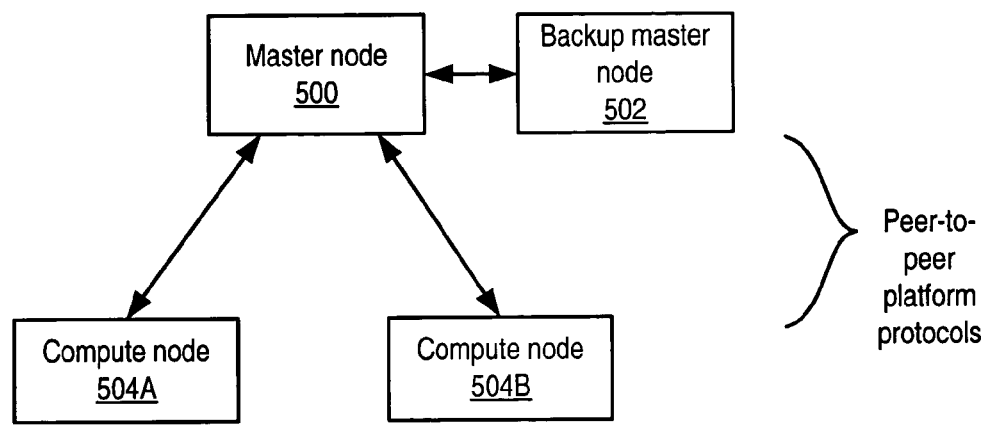
FIG. 9 illustrates a grid with a backup master node according to one embodiment.
Figure 10:
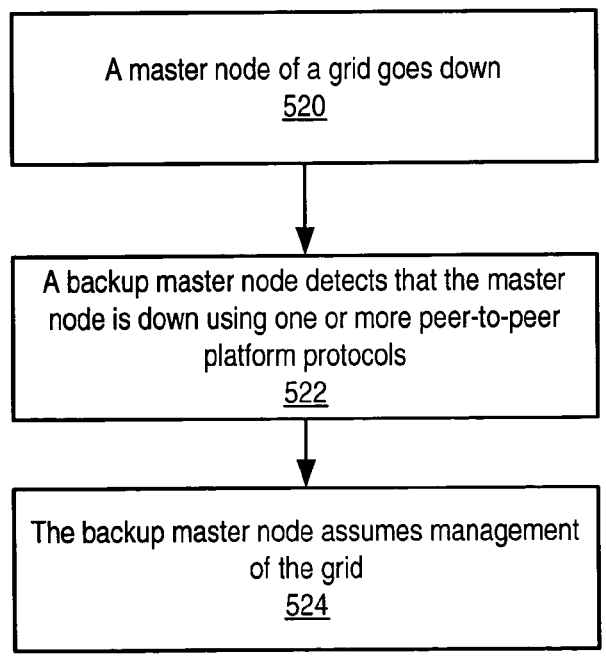
FIG. 10 is a flowchart illustrating operations of a grid with a backup master node according to one embodiment.

FIGS. 9 and 10 illustrate means for detecting that a master node of a grid is no longer available using one or more peer-to-peer platform protocols and means for another node (a backup master node) to assume management of one or more compute nodes of the grid.

In the prior art, grids have one master node, which presents the problem of a single point of failure. As illustrated in FIG. 9, one embodiment may provide one or more backup master nodes 502 that may be configured to take over operation of a grid if a master node 500 goes down. In one embodiment, a grid may discover that a master node 500 has gone down automatically using one or more peer-to-peer platform (e.g. JXTA) protocols. Another node (backup master node 502) may then replace the departed master node 500 as the master node of the grid, and may advertise that it is now the master node for the grid using the peer-to-peer platform protocols. Job submitters may then discover the new master node and submit jobs to the new master node using the peer-to-peer platform protocols. The compute nodes 504 that formerly communicated with the departed master node for job computation may update their grid configuration information to indicate that backup master node 502 is now the master node for the grid.

In one embodiment, a backup master node 502 may discover that the master node 500 has failed using the peer-to-peer platform protocols. In one embodiment, a backup master node 502 may periodically poll or attempt to discover the master node 500 using one or more peer-to-peer platform protocols, and upon determining that it can no longer discover the master node 500 may take over the role of master node for the grid. In one embodiment, the master node 500 may notify the backup master node 502 that it is leaving the grid using one or more peer-to-peer platform protocols.

Typically, in a grid, the compute nodes 504 do not know about each other. A master node 500 may communicate with, control, and maintain information about the compute nodes 504. In one embodiment, when the new master node (backup master node 502) takes over as master node of the grid, it may use the peer-to-peer platform protocols to discover the compute nodes 504 on the grid. Alternatively, backup master node 502 may "shadow" the master node 500 and keep updated information about the grid network. In one embodiment, after taking over the grid, the new master node (backup master node 502) may reconfigure the compute nodes 504 to inform them that it is now the master node using one or more peer-to-peer platform protocols. In one embodiment, a backup master node 502 that is shadowing a master node 500 may maintain updated state information about jobs being performed by compute nodes 504 on the grid using one or more peer-to-peer platform protocols. The backup master node 502 may keep an updated copy of current and/or pending job information, compute nodes, and other information necessary to take over the role of master node on the grid, preferably with little or no disruption of operations, using one or more peer-to-peer platform protocols.

FIG. 10 is a flowchart illustrating operation of a grid with a backup master node according to one embodiment. In one embodiment, a backup master node may communicate with the master node of a grid using one or more peer-to-peer platform protocols to collect and maintain information about the one or more compute nodes of the grid. In one embodiment, the information about the one or more compute nodes may include, but is not limited to, state information about one or more jobs executing on the compute nodes. In one embodiment, the grid may be configured according to Sun Cluster Grid architecture. Other embodiments may use other grid architectures. In one embodiment, the peer-to-peer platform protocols may be JXTA protocols. Other embodiments may use other peer-to-peer platform protocols.

As indicated at 520, the master node managing operations of the grid may go down. As indicated at 522, the backup master node may detect that the master node is down using one or more peer-to-peer platform protocols. In one embodiment, the backup master node may poll the master node using one or more peer-to-peer platform protocols, and may determine that the master node is down if the master node does not respond to the poll. In one embodiment, the master node may send a notification to the backup master node to inform the backup master node that it is going down and that the backup master node needs to assume management of the grid. In other embodiments, other mechanisms may be used to detect if the master node is down.

As indicated at 524, the backup master node may assume management of the grid after determining that the master node is down. In one embodiment, assuming management of the grid may include advertising that the backup master node has assumed management of the grid using one or more peer-to-peer platform protocols. In one embodiment, assuming management of the grid may include the backup master node discovering the one or more compute nodes of the grid using one or more peer-to-peer platform protocols. In one embodiment, assuming management of the grid may include the backup master node notifying the one or more compute nodes of the grid that the backup master node has assumed management of the grid using one or more peer-to-peer platform protocols. The compute nodes may update their grid configuration information to indicate that the backup master node has assumed management of the grid in response to the notification.

Embodiments of an autonomic grid computing mechanism may provide a mechanism for grid brokering. In one embodiment, if a grid has too many pending jobs, or if it has certain jobs pending for which it cannot find a suitable execution host (e.g., due to resource requirements which cannot be fulfilled), one or more peer-to-peer platform (e.g. JXTA) protocols may be used by the grid master node to discover one or more other grids and to determine if these other grids can take some of the job load, or can perform a job with special requirements. In one embodiment, out of all possible grids, the grid brokering mechanism may be used to determine which grid is best suited to accept which jobs.

In one embodiment, if the master node determines it may not be able to handle a job submitted by a job submitter (e.g. due to overload or missing resource requirements), the master node may try to find another grid (and another master node) that can handle the job (or part of a job) using one or more peer-to-peer platform protocols. In other words, the master node may subcontract a job, e.g. determine if there is another grid that can perform the job (or part of a job) and forward the job to the other grid for execution using one or more peer-to-peer platform protocols.

Figure 11:
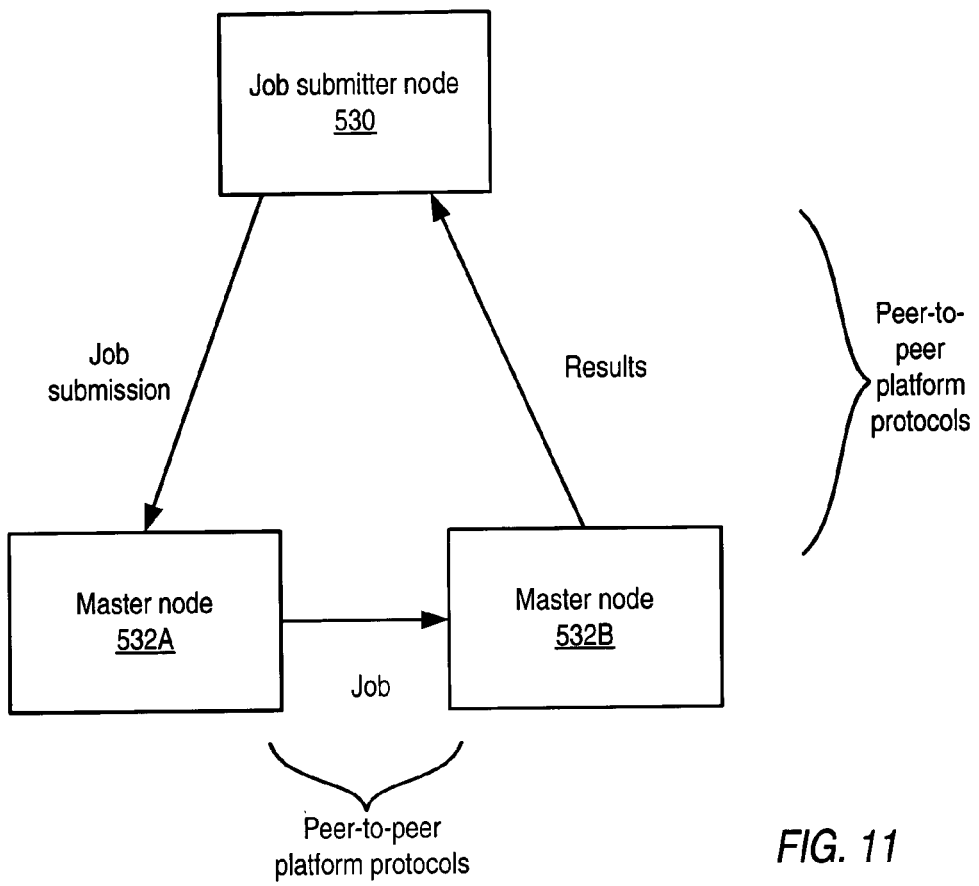
FIG. 11 illustrates grid brokering according to one embodiment.
Figure 12:
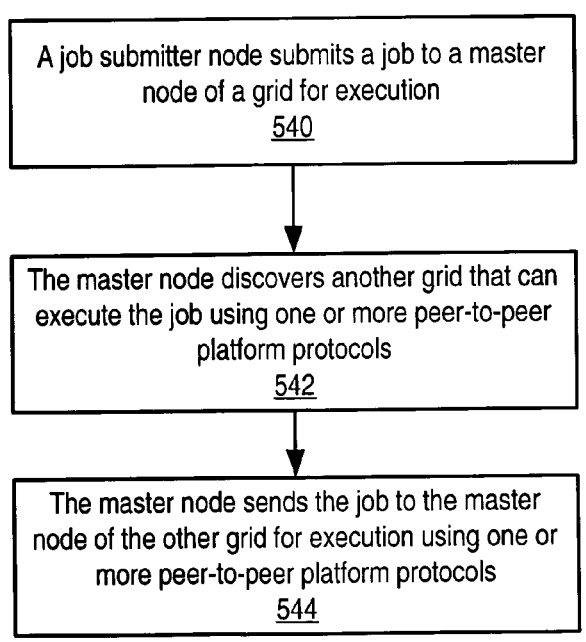
FIG. 12 is a flowchart of a method for grid brokering according to one embodiment.

FIGS. 11 and 12 illustrate means for a master node of a grid to discover another grid that can execute a job submitted to the master node for execution, and means for the master node to send the job to a master node of the other grid for execution.

FIG. 11 illustrates grid brokering according to one embodiment. Master node 532A may receive a job from job submitter node 530 via one or more peer-to-peer platform protocols. Master node 532A may determine that the grid is too busy to handle the job in a timely manner, and/or that the grid lacks one or more resources to perform special requirements of the job. Master node 532A may then use one or more peer-to-peer platform protocols and discovery mechanisms to search for and communicate with one or more other grids to locate one or more grids that are able to handle the job or part of the job (e.g. the grids are less busy and/or have the resources to perform special requirements of the job). In this example, master node 532A determines that a grid managed by master node 532B can handle the job or part of the job, and then forwards the job (or part of the job) to master node 532B for execution on the grid, in one embodiment using one or more peer-to-peer platform protocols. Master node 532B may send results of job execution to job submitter node 530, or alternatively may return results to master node 532A which may then send the results to job submitter node 530, in one embodiment using one or more peer-to-peer platform protocols.

FIG. 12 is a flowchart of a method for grid brokering according to one embodiment. As indicated at 540, a job submitter node may submit a job to a master node of a grid for execution. The master node may determine that the grid cannot handle the job for some reason (e.g., overload or missing resource requirements). As indicated at 542, the master node may then discover another grid that can execute the job using one or more peer-to-peer platform protocols. As indicated at 544, the master node may then send the job (or part of the job) to a master node of the other grid for execution using one or more peer-to-peer platform protocols. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

Figure 13:
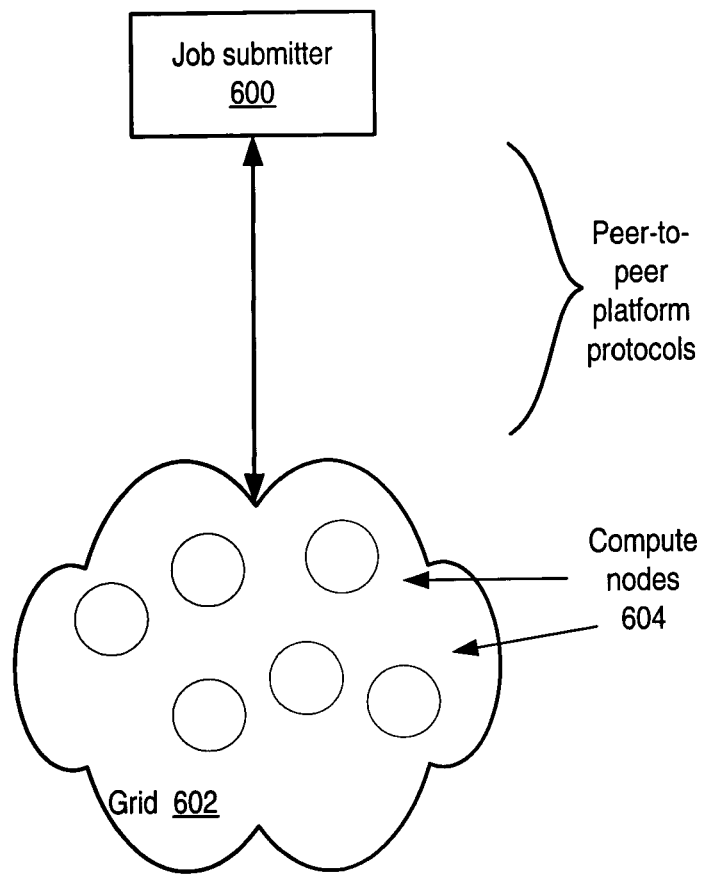
FIG. 13 illustrates decentralized grids according to one embodiment.
Figure 14:
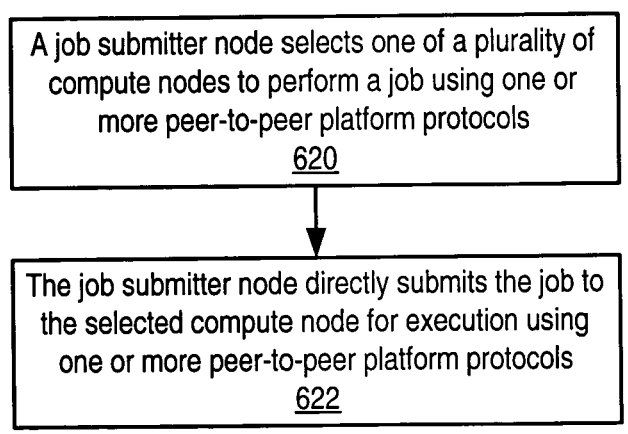
FIG. 14 is a flowchart of a method for submitting jobs in a decentralized grid according to one embodiment.

Embodiments of an autonomic grid computing mechanism may provide a mechanism for decentralized grids where job submitters can directly select compute nodes and directly submit jobs to the selected compute nodes without going through master nodes. FIGS. 13 and 14 illustrate means for a job submitter node to select one of a plurality of compute nodes to perform a job, means for the job submitter node to directly submit the job to the selected compute node for execution, and means for the selected compute node to directly return results of the job to the job submitter node.

In a typical prior art grid configuration, the Master node acts as a centralized server, and thus may become a bottleneck. In one embodiment, as illustrated in FIG. 13, peer-to-peer platform protocols may be used to implement decentralized grids that may preferably reduce or eliminate the bottleneck problem by reducing or eliminating the role of Master node. In one embodiment, in a decentralized grid, a job submitter 600 may directly search for a compute node 604 that is suitable to run a job using one or more peer-to-peer platform protocols, and then may directly submit the job to the compute node 604 using one or more peer-to-peer platform protocols, hence bypassing the need for a master node.

In essence, the decentralized grid is a two-tier architecture that eliminates the middle tier of the prior art cluster grid architecture by merging the management functions with the access tier.

FIG. 14 is a flowchart of a method for submitting jobs in a decentralized grid according to one embodiment. As indicated at 620, a job submitter node may directly select one of a plurality of compute nodes to perform a job using one or more peer-to-peer platform protocols. As indicated at 622, the job submitter node may then directly submit the job to the selected compute node for execution using one or more peer-to-peer platform protocols. The compute node may directly return results of execution to the job submitter node. In this method, the job submitter node bypasses master nodes, and thus in one embodiment of decentralized grids there may be no master nodes in grids. In one embodiment, the job submitter node and compute nodes may be configured according to Sun Cluster Grid architecture. Other embodiments may use other grid architectures. In one embodiment, the peer-to-peer platform protocols may be JXTA protocols. Other embodiments may use other peer-to-peer platform protocols.

Embodiments of an autonomic grid computing mechanism may provide a mechanism for monitoring nodes in a grid farm. In one embodiment, a master node may maintain a database of other nodes (e.g. compute nodes) in the grid farm. In one embodiment, one or more peer-to-peer platform protocols (e.g., JXTA's Peer Information Protocol) may be used by the master node to query the other nodes about the nodes' status. The status may include one or more of, but is not limited to: current queue length, current pending jobs, estimated time to complete a current job, etc.

In one embodiment, a master node may discover information about the compute nodes using one or more peer-to-peer platform protocols. The master node may monitor the compute nodes and perform administration of the grid. In one embodiment, compute nodes may discover information about one or more master nodes using one or more peer-to-peer platform protocols. The compute nodes may monitor the master node; for example, to determine the status of the master node.

In one embodiment, there may be a separate node (e.g. a peer in a peer-to-peer network), referred to as a monitor node, running a monitor application. The monitor node may keep status information for one or more master nodes and their associated grids (compute nodes). In one embodiment, the monitor node may use one or more peer-to-peer platform protocols to poll or otherwise obtain grid information from the master node(s). In one embodiment, the master node(s) may maintain status information about the compute nodes on the grid(s). If a compute node leaves or joins the grid, the peer-to-peer platform protocols may be used to update the master node with the information, and a grid configuration maintained by the monitor application on the separate node may be updated accordingly using the peer-to-peer platform protocols.

Figure 15:
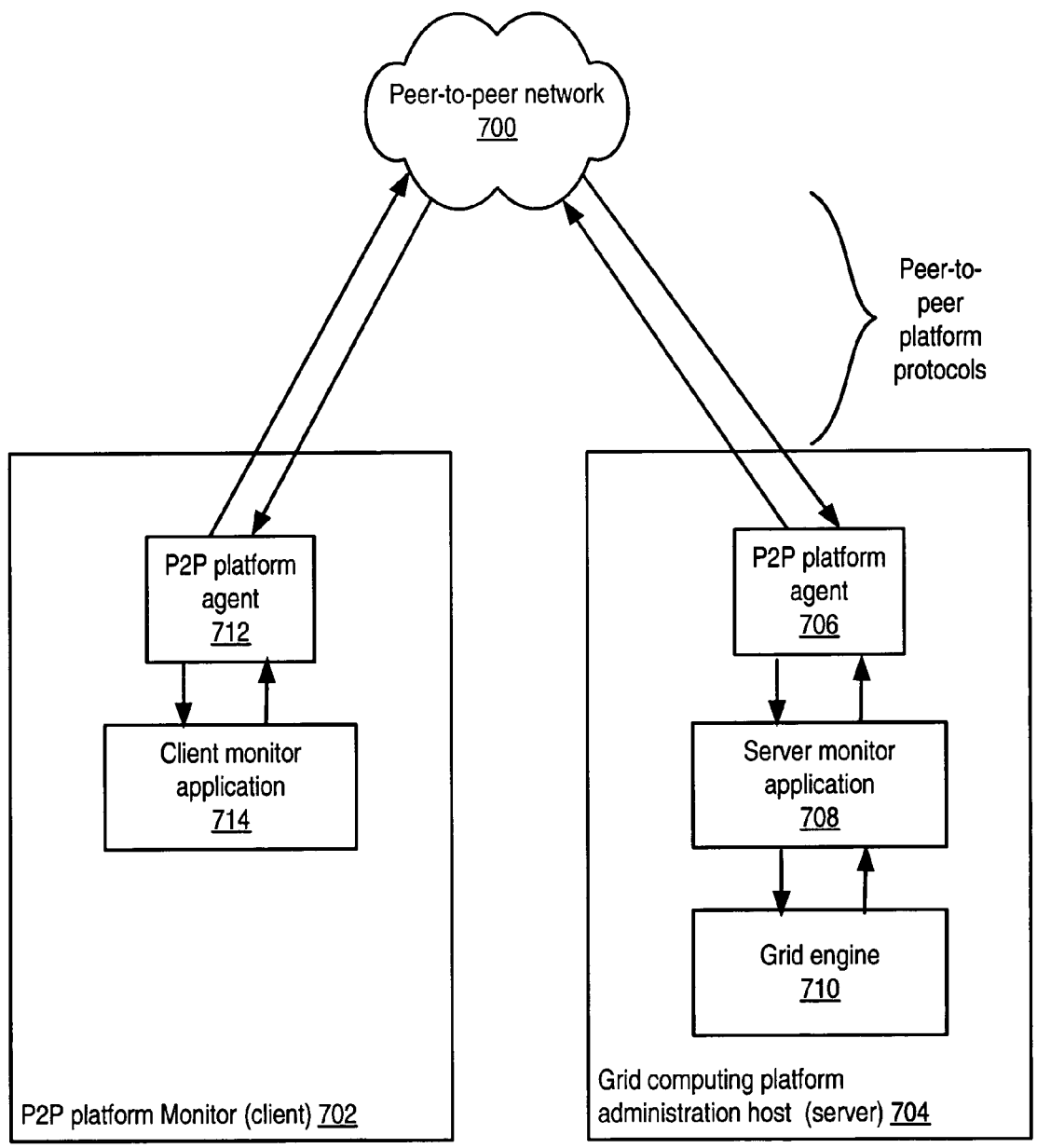
FIG. 15 illustrates grid monitoring according to one embodiment.
Figure 16:
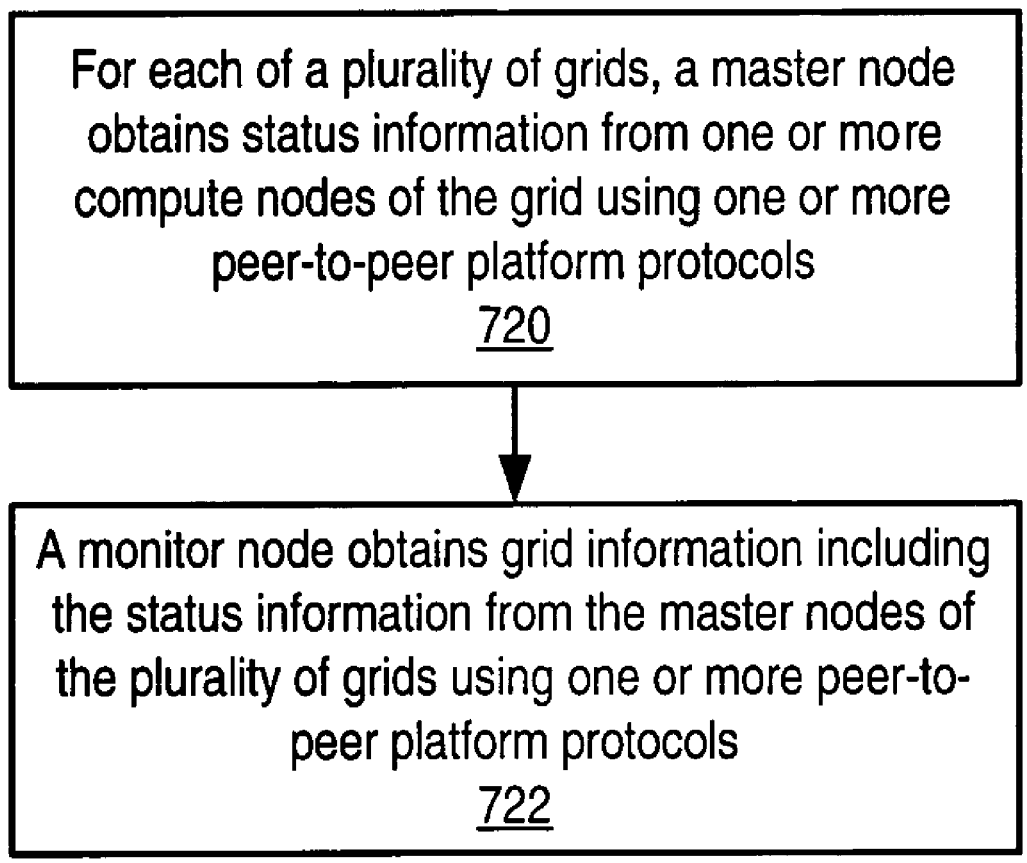
FIG. 16 is a flowchart of a method of monitoring grids according to one embodiment.

FIGS. 15 and 16 illustrate means for a master node of each of a plurality of grids to obtain status information from one or more compute nodes of the master node's grid, and means for a monitor node to obtain grid information including the status information from the master nodes of the plurality of grids.

FIG. 15 illustrates grid monitoring according to one embodiment. In one embodiment, peer-to-peer platform (e.g. JXTA) agents (706 and 712) may be used to monitor a grid over a peer-to-peer network. In one embodiment, the grid management/monitoring system may be a client/server model, with a server application on an administration host within the grid. In one embodiment, that may be on the same system or on a different system from that of the Distributed Resource Management System (DRMS) (i.e. master host node) depending on implementation and constraints of the DRMS. In one embodiment as illustrated in FIG. 15, a Grid Engine 710 may be administered indirectly via an administration host 704 defined by a system administrator. The client software may reside on any platform that can communicate via the peer-to-peer platform protocols. These platforms may be personal computers, servers, workstations, PDAs, mobile phones, or any system with a digital heartbeat and capable of hosting the client software.

The server side of the client/server model is represented by administration host 704 in FIG. 15. In one embodiment, the Server Monitor Application 708 may poll the Master Host(s) on the grid(s) on peer-to-peer network 700. The Server Monitor Application 708 may obtain the status of the queues and the nodes within the cluster from the Grid Master. The Server Monitor Application 708 may then make the data available to the peer-to-peer platform agent 712 on the master side.

In one embodiment, the P2P platform agent 706 may connect to a relay/rendezvous node on the peer-to-peer platform network 700 and create a group. This group may then be joined by other peers within the peer-to-peer network, allowing them to communicate with each other using one or more peer-to-peer platform protocols. The P2P platform agent 706 may then broadcast this information to the rest of the group.

The client side of the client/server model is represented by P2P platform monitor 702 in FIG. 15. P2P platform agent 712 may poll the peer-to-peer platform network for messages from the grid peer group, and may cache results to be used by the client grid monitor application 714. Client monitor application 714 may access the cached data, for example to display the data from the grid, either dynamically or on request, to the user.

FIG. 16 is a flowchart of a method of monitoring grids according to one embodiment. As indicated at 720, for each of a plurality of grids, a master node of the grid may obtain status information from one or more compute nodes of the grid using one or more peer-to-peer platform protocols. As indicated at 722, a monitor node may obtain grid information including the status information from the master nodes via one or more peer-to-peer platform protocols. In one embodiment, the grid information obtained by the monitor node may be used in monitoring and administering the grids. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

In one embodiment, peer-to-peer platform (e.g. JXTA) protocols may be used to remotely administer one or more grids, decentralized grids, and/or grids in a multi-grid environment, for example using communication (e.g. JXTA pipe) protocols. A grid administration node may include one or more grid administration applications for managing the grids using the peer-to-peer platform. In one embodiment, the administration node may also include a monitor mechanism to monitor the grid(s). An exemplary grid administration tasks that may be performed using embodiments is adding or removing one or more machines depending on load. Another example is gathering statistics, for example, price/performance statistics, for use in decision making. The gathered statistics may be used to answer questions such as: Is this grid viable? Are more machines needed? When would be the right time to buy new machines? Gathered statistics may also be used in making load predictions. Other administrative tasks than these exemplary tasks may be performed using embodiments.

Figure 17:
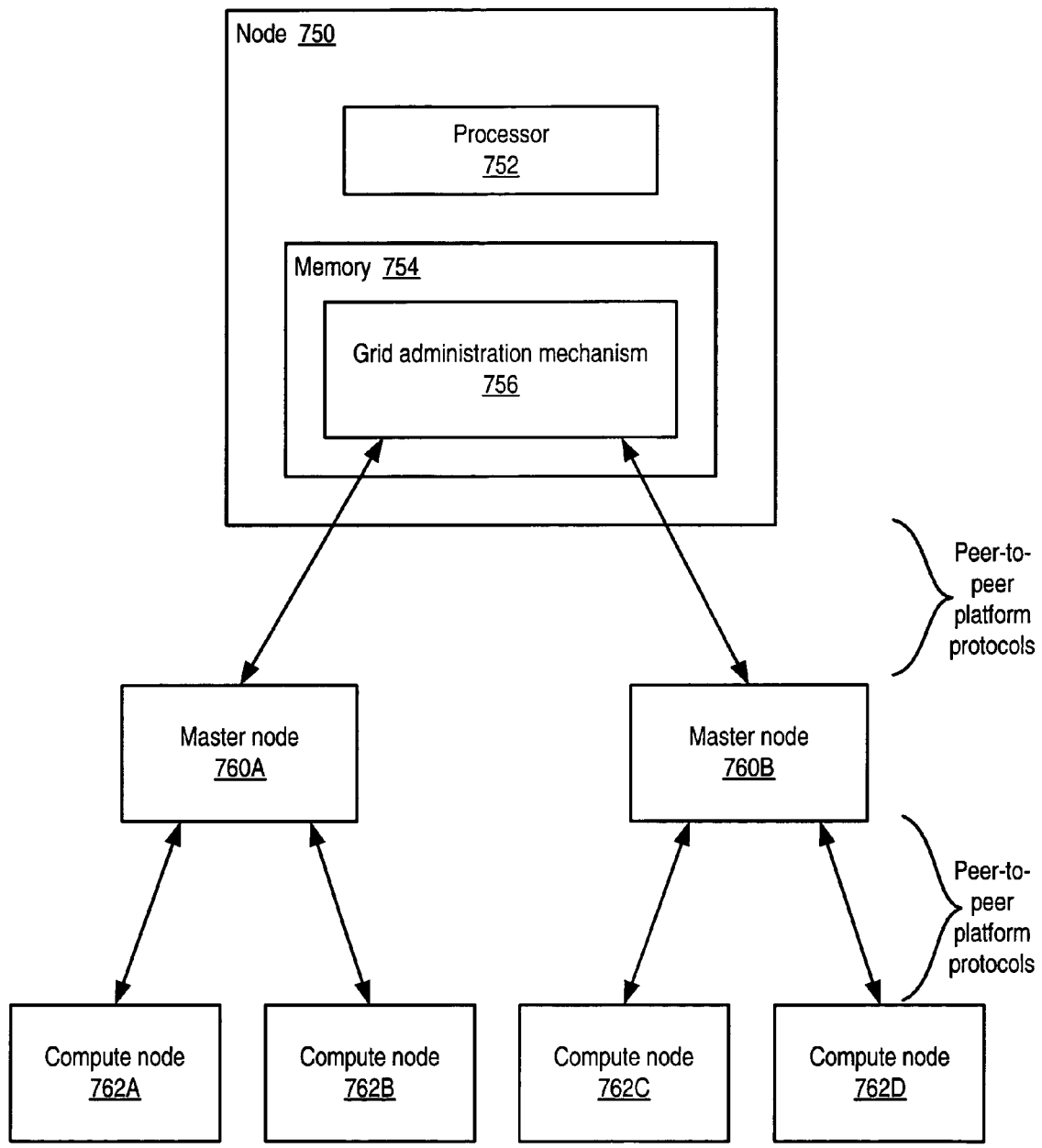
FIG. 17 illustrates a system (node) implementing a grid administration mechanism according to one embodiment.
Figure 18:
FIG. 18 is a flowchart of a method for remote administration of grids according to one embodiment.

FIGS. 17 and 18 illustrate means for a grid administration node to obtain grid information from one or more grids, and means for the grid administration node to remotely manage operations of the one or more grids using the obtained grid information.

FIG. 17 illustrates a system (node 750) implementing a grid administration mechanism according to one embodiment. Node 750 may be any of various types of devices, including, but not limited to, a personal computer system, desktop computer, laptop or notebook computer, mainframe computer system, workstation, network computer, or other suitable device. Node 750 may include at least one processor 752. The processor 752 may be coupled to a memory 754. Memory 754 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. Node 750 may couple over a network to one or more other devices via one or more wired or wireless network interfaces.

Node 750 may include, in memory 754, a grid administration mechanism 756. Master nodes 760 may use one or more peer-to-peer platform protocols to gather information from compute nodes 762. Grid administration mechanism 756 may use one or more peer-to-peer platform protocols to gather grid information from master nodes 760. This grid information may include information collected from compute nodes 762. Grid administration mechanism 756 may be used to remotely perform various administrative and monitoring tasks for the grids using one or more peer-to-peer platform protocols. At least part of the grid information may be displayed for the user on node 750 by grid administration mechanism 756.

FIG. 18 is a flowchart of a method for remote administration of grids according to one embodiment. As indicated at 780, a grid administration node may obtain grid information from one or more grids using one or more peer-to-peer platform protocols. The grid administration node may remotely manage operations of the one or more grids via one or more peer-to-peer platform protocols and using the obtained grid information. In one embodiment, the grids may be configured according to Sun Cluster Grid architecture. Other embodiments may use other grid architectures. In one embodiment, the peer-to-peer platform protocols may be JXTA protocols. Other embodiments may use other peer-to-peer platform protocols.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A grid computing system, comprising:
   a grid comprising one or more compute nodes each already configured to participate in the grid with current executable software to perform one or more compute jobs;
   a master node configured to manage the grid; and
   a node, wherein when the node is not configured with the current executable software to perform one or more compute jobs to participate in the grid as a compute node, the node is configured to:
   discover the master node in accordance with one or more peer-to-peer platform protocols; and
   in response to said discovering the master node, send information about the node to the discovered master node in accordance with the one or more peer-to-peer platform protocols;
   wherein the master node is further configured to, in response to said information about the node, send grid configuration information to the node in accordance with the one or more peer-to-peer platform protocols; and
   wherein the node is further configured to, in response to said grid configuration information received from the discovered master node, self-configure as a compute node in the grid in accordance with the grid configuration information, wherein after self-configuring as a compute node the node is configured with the current executable software to perform one or more compute jobs in the grid.

2. The grid computing system as recited in claim 1, wherein the node comprises a bootstrapping mechanism configured to discover the master node and to send information about the node to the discovered master node in accordance with the one or more peer-to-peer platform protocols at startup of the node.

3. The grid computing system as recited in claim 1, wherein the node was previously configured as a compute node, and wherein, to self-configure as a compute node in the grid in accordance with the grid configuration information, the node is further configured to update configuration of the node as a compute node in accordance with the grid configuration information.

4. The grid computing system as recited in claim 1,
   wherein the information about the node includes compute node configuration information for the node;
   wherein the master node is further configured to determine from the compute node configuration information that the compute node configuration needs to be updated; and
   wherein the grid configuration information sent to the node includes update information for the compute node configuration.

5. The grid computing system as recited in claim 1, wherein the node is further configured to send the master node notification that the node is leaving the grid in accordance with the one or more peer-to-peer platform protocols.

6. The grid computing system as recited in claim 1, wherein the master node is further configured to:
submit a job to the node for execution in accordance with the one or more peer-to-peer platform protocols;
detect that the node is no longer participating as a compute node in the grid in accordance with the one or more peer-to-peer platform protocols; and
resubmit the job to another compute node of the grid for execution in accordance with the one or more peer-to-peer platform protocols.

7. The grid computing system as recited in claim 1, wherein the grid computing system further comprises a job submitter node, and wherein the master node is further configured to:
receive a job from the job submitter node in accordance with the one or more peer-to-peer platform protocols;
distribute the job to the compute node for execution in accordance with the one or more peer-to-peer platform protocols;
receive results of the execution from the compute node in accordance with the one or more peer-to-peer platform protocols; and
send the results to the job submitter node in accordance with the one or more peer-to-peer platform protocols.

8. The grid computing system as recited in claim 1, wherein the grid computing system is configured according to Sun Cluster Grid architecture.

9. The grid computing system as recited in claim 1, wherein the peer-to-peer platform protocols are JXTA protocols.

10. A grid computing system, comprising:
a plurality of nodes, wherein one or more of the nodes are each already configured to participate in the grid with current executable software to perform one or more compute jobs; and
a master node configured to communicate with one or more of the plurality of nodes not configured with the current executable software to perform one or more compute jobs to participate in the grid as compute nodes in accordance with one or more peer-to-peer platform protocols to:
configure the one or more of the plurality of nodes with the current executable software to perform one or more compute jobs to participate as compute nodes in the grid computing system; and
submit jobs to the compute nodes for execution.

11. The grid computing system as recited in claim 10, further comprising one or more job submitter nodes, wherein the master node is further configured to:
receive the jobs from the job submitter nodes in accordance with the one or more peer-to-peer platform protocols;
receive results of the execution of the jobs from the compute nodes in accordance with the one or more peer-to-peer platform protocols; and
send the results to the job submitter nodes in accordance with the one or more peer-to-peer platform protocols.

12. The grid computing system as recited in claim 10, wherein the grid computing system is configured according to Sun Cluster Grid architecture.

13. The grid computing system as recited in claim 10, wherein the peer-to-peer platform protocols are JXTA protocols.

14. A node, comprising:
a processor; and
a memory comprising program instructions, wherein the program instructions are executable by the processor to:
when the node is not configured with current executable software to perform one or more compute jobs to participate in a grid as a compute node, discover a master node in accordance with one or more peer-to-peer platform protocols, wherein the master node is configured to manage the grid, wherein the grid comprises one or more compute nodes already configured with the current executable software to perform one or more compute jobs to participate in the grid;
in response to said discovering the master node, send information about the node to the discovered master node in accordance with the one or more peer-to-peer platform protocols;
receive grid configuration information from the master node in accordance with the one or more peer-to-peer platform protocols; and
in response to said received grid configuration information, self-configure as a compute node in the grid in accordance with the grid configuration information, wherein after self-configuring as a compute node the node is configured with the current executable software to perform one or more compute jobs in the grid.

15. The node as recited in claim 14, wherein the program instructions are executable by the processor to implement a bootstrapping mechanism configured to discover the master node and to send information about the node to the discovered master node in accordance with the one or more peer-to-peer platform protocols at startup of the node.

16. The node as recited in claim 14, wherein the grid is configured according to Sun Cluster Grid architecture.

17. The node as recited in claim 14, wherein the peer-to-peer platform protocols are JXTA protocols.

18. A node, comprising:
means for discovering a master node when the node is not configured with current executable software to perform one or more compute jobs to participate in a grid as a compute node, wherein the master node is configured to manage the grid, wherein the grid comprises one or more compute nodes already configured with the current executable software to perform one or more compute jobs to participate in the grid;
means for obtaining grid configuration information from the master node in response to said discovering the master node; and
means for configuring as a compute node in the grid in response to the grid configuration information received from the discovered master node and in accordance with the grid configuration information, wherein after configuring as a compute node the node is configured with the current executable software to perform one or more compute jobs in the grid.

19. A method, comprising:
a node not currently configured with current executable software to perform one or more compute jobs to participate in a grid as a compute node discovering a master node in accordance with one or more peer-to-peer platform protocols, wherein the master node is configured to manage the grid, wherein the grid comprises one or more compute nodes already configured with the current executable software to perform one or more compute jobs to participate in the grid;

in response to said discovering the master node, the node sending information about the node to the discovered master node in accordance with the one or more peer-to-peer platform protocols;

in response to said information about the node, the master node sending grid configuration information to the node in accordance with the one or more peer-to-peer platform protocols; and the node self-configuring as a compute node in the grid in response to the grid configuration information received from the discovered master node and in accordance with the grid configuration information, wherein after self-configuring as a compute node the node is configured with the current executable software to perform one or more compute jobs in the grid.

20. The method as recited in claim 19, wherein the node was previously configured as a compute node, and wherein said self-configuring as a compute node in the grid comprises updating configuration of the node as a compute node in accordance with the grid configuration information.

21. The method as recited in claim 19, wherein the information about the node includes compute node configuration information for the node, the method further comprising:

the master node determining that the compute node configuration needs to be updated from the compute node configuration information; and the master node including update information for the compute node configuration in the grid configuration information sent to the node in response to said determining that the compute node configuration needs to be updated.

22. The method as recited in claim 19, further comprising the node sending the master node notification that the node is leaving the grid in accordance with the one or more peer-to-peer platform protocols.

23. The method as recited in claim 22, further comprising:

the master node submitting a job to the node for execution in accordance with the one or more peer-to-peer platform protocols;

the master node detecting that the node is no longer participating as a compute node in the grid in accordance with the one or more peer-to-peer platform protocols; and the master node resubmitting the job to another compute node of the grid for execution in accordance with the one or more peer-to-peer platform protocols.

24. The method as recited in claim 19, further comprising:

the master node receiving a job from a job submitter node in accordance with the one or more peer-to-peer platform protocols;

the master node distributing the job to the compute node for execution in accordance with the one or more peer-to-peer platform protocols;

the master node receiving results of the execution from the compute node in accordance with the one or more peer-to-peer platform protocols; and the master node sending the results to the job submitter node in accordance with the one or more peer-to-peer platform protocols.

25. The method as recited in claim 19, wherein the grid is configured according to Sun Cluster Grid architecture.

26. The method as recited in claim 19, wherein the peer-to-peer platform protocols are JXTA protocols.

27. A computer-accessible storage medium storing program instructions, wherein the program instructions are computer-executable to implement:

a node not currently configured with current executable software to perform one or more compute jobs to participate in a grid as a compute node discovering a master node in accordance with one or more peer-to-peer platform protocols, wherein the master node is configured to manage the grid, wherein the grid comprises one or more compute nodes already configured with the current executable software to perform one or more compute jobs to participate in the grid;

in response to said discovering the master node, the node sending information about the node to the discovered master node in accordance with the one or more peer-to-peer platform protocols;

in response to said information about the node, the master node sending grid configuration information to the node in accordance with the one or more peer-to-peer platform protocols; and the node self-configuring as a compute node in the grid in response to the grid configuration information received from the discovered master node and in accordance with the grid configuration information, wherein after self-configuring as a compute node the node is configured with the current executable software to perform one or more compute jobs in the grid.

28. The computer-accessible storage medium as recited in claim 27, wherein the node was previously configured as a compute node, and wherein, in said self-configuring as a compute node in the grid, the program instructions are further computer-executable to implement updating configuration of the node as a compute node in accordance with the grid configuration information.

29. The computer-accessible storage medium as recited in claim 27, wherein the information about the node includes compute node configuration information for the node, and wherein the program instructions are further computer-executable to implement:

the master node determining that the compute node configuration needs to be updated from the compute node configuration information; and the master node including update information for the compute node configuration in the grid configuration information sent to the node in response to said determining that the compute node configuration needs to be updated.

30. The computer-accessible storage medium as recited in claim 27, wherein the program instructions are further computer-executable to implement the node sending the master node notification that the node is leaving the grid in accordance with the one or more peer-to-peer platform protocols.

31. The computer-accessible storage medium as recited in claim 30, wherein the program instructions are further computer-executable to implement:

the master node submitting a job to the node for execution in accordance with the one or more peer-to-peer platform protocols;

the master node detecting that the node is no longer participating as a compute node in the grid in accordance with the one or more peer-to-peer platform protocols; and the master node resubmitting the job to another compute node of the grid for execution in accordance with the one or more peer-to-peer platform protocols.

32. The computer-accessible storage medium as recited in claim 27, wherein the program instructions are further computer-executable to implement:

the master node receiving a job from a job submitter node in accordance with the one or more peer-to-peer platform protocols;

the master node distributing the job to the compute node for execution in accordance with the one or more peer-to-peer platform protocols;

the master node receiving results of the execution from the compute node in accordance with the one or more peer-to-peer platform protocols; and the master node sending the results to the job submitter node in accordance with the one or more peer-to-peer platform protocols.

33. The computer-accessible storage medium as recited in claim 27, wherein the grid is configured according to Sun Cluster Grid architecture.

34. The computer-accessible storage medium as recited in claim 27, wherein the peer-to-peer platform protocols are JXTA protocols.

* * * * *